UNITED STATES PATENT OFFICE.

EDWARD L. FORD, OF LYONS, NEW YORK.

LINING FOR IRON AND STEEL FURNACES.

SPECIFICATION forming part of Letters Patent No. 279,089, dated June 5, 1883.

Application filed December 22, 1881. (No specimens.)

*To all whom it may concern:*

Be it known that I, EDWARD L. FORD, a citizen of the United States, residing at Lyons, in the county of Wayne and State of New York, have invented a new and useful Improvement in the Lining of Iron and Steel Furnaces or other Vessels; and I do hereby declare that the following is a full, clear, and exact description of the invention, which will enable others skilled in the art to which it appertains to make and use the same.

The object of my invention is to produce a lining for furnaces or other vessels in which iron or steel is melted or refined, such that it may resist the combined action of the metal and slag more perfectly than is at present possible.

I find that by the use of certain varieties of titanic iron ores as linings, slags containing large percentages of the oxides of iron or other basic additions may be used without the chemical affinities of the slag for the lining being such as to cut it away or corrode it, and thus either add hurtful properties to the slag itself, or make the lining practically valueless on account of its want of durability; also, that the metal will have little or no action on said lining, especially in the presence of sesquioxide of iron. I find, after long experimenting, that the ores best suited for such a lining are those containing ten per cent. and upward of titanic acid, small percentages of silica, little or no alumina, and the remainder magnetic oxide of iron. It is best to keep the silica below six per cent., while the larger the amount of titanic acid the better, "rutile" being the maximum in that case, there being no magnetic oxide of iron.

If it were possible to use titanic acid in a pure state for this lining, and the same could be so obtained, it would best suit my purpose. This not being possible, I desire to make a lining having as much of this substance as possible.

There is a mineral substance found on or near the shore of Lake Champlain, near Crown Point, in Essex county, New York, in a mine called "Split Rock Ore Bed," which contains the several elements in the necessary proportions, the analysis showing about the following ratio: magnetic oxide of iron, sixty-five per cent.; titanic acid, twenty-five per cent.; silica, five per cent.; and alumina, lime, &c., five per cent. I therefore propose to make the lining of roughly-dressed lumps of such ore as the above described, with the interstices filled with the same ore finely ground.

In case the ore alone should be too refractory, as silicate of alumina is a flux for these titanic ores, small percentages of clay mixed with the fine ore makes it set when exposed to heat, the amount of clay necessary depending on the heat attainable in the furnace to be used.

I am aware that linings for furnaces and other vessels in which iron or steel is melted and refined have been formed from compounds containing alumina, magnetic oxide of iron, silica, &c.; but in all such cases, so far as I am aware, the alumina has been in excess, so as to form with the magnetic oxide of iron the base or body of the lining, while the titanic acid has been present in small percentages, and simply as an impurity, or to flux with the other material and form a binder. Such a lining I hereby disclaim. In my lining the reverse is the case—that is to say, the titanic acid is preferably present in the greatest attainable percentages, while the silica and alumina are regarded as impurities, and are restricted to such percentages as are necessary to flux with and form a binder for the titanic acid, magnetic oxide of iron, &c.

Having thus fully described my invention, what I claim, and desire to secure by Letters Patent, is—

1. A lining for furnaces, &c., wherein iron or steel is melted and refined, the same consisting of an excess of titanic acid and magnetic oxide of iron to form the base or body of the lining, and a minimum of alumina and silica to flux with and form a binder for the titanic acid, &c., substantially as and for the purpose specified.

2. The compound for furnace-linings herein described, which consists of a base or body composed of magnetic oxide of iron, and ten per cent. or more of titanic acid, and a binder or flux of five per cent. or less of silica and alumina, substantially as and for the purpose specified.

EDWARD L. FORD.

Witnesses:
T. J. LOUIS,
WM. WHITE, Jr.